Patented Feb. 15, 1944

2,341,782

UNITED STATES PATENT OFFICE 2,341,782

TREATMENT OF HYDROCARBON OILS

Vladimir N. Ipatieff and Louis Schmerling, Chicago, Ill., assignors to Universal Oil Products Company, Chicago, Ill., a corporation of Delaware No Drawing. Application September 13, 1940,
Serial No. 356,652

9 Claims. (Cl. 196—53)

This invention relates to the treatment of relatively heavy hydrocarbons or hydrocarbon mixtures of which fractions of petroleum and primary distillates from the distillation of coal, wood, and shale are typical. It is more specifically concerned with processes for the so-called "destructive" hydrogenation of these oils to produce lower boiling products therefrom. The invention is particularly characterized by the use of novel types of catalysts for accomplishing these purposes.

Destructive hydrogenation, as distinguished from the simple addition of hydrogen to unsaturated bonds between carbon atoms, involve definite changes in structure, and may be designated as cracking under hydrogenating conditions so that the lower boiling products of the cracking reactions are substantially more saturated than when hydrogen or materials supplying hydrogen are not present. Destructive hydrogenation processes are most commonly employed on coals and heavy residual or distillate oils for the production of substantial yields of low boiling saturated products and to some extent of intermediates utilizable as domestic fuels and still heavier cuts suitable as lubricants. These destructive hydrogenation processes may be operated on a strictly thermal basis or in the presence of catalysts and in this respect an extremely large number of materials have been employed, for example, the metals of the iron group, including iron, nickel, or cobalt and the oxides and sulfides of chromium, molybdenum, and tungsten, representing the metals in the left-hand clumn of group 6 of the periodic table. Numerous mixed metal and metal oxide catalysts have also been tried and less commonly metal salts.

Destructive hydrogenation operations are commonly conducted at relatively high hydrogen pressures, particularly those which are operated without the use of catalysts, pressures of 3000–5000 lbs./sq. in. being not uncommon, although with suitable catalysts, these pressures can be reduced. Temperatures are usually those within a slightly below the oil cracking range, say from 700 to 900° F. Hydrogen is preferably present in considerably molal excess and gas mixtures containing hydrogen and other gases such as methane, carbon monoxide, nitrogen, etc. may be employed. The present process embodies improved catalysts for use in destructive hydrogenation processes, which catalysts permit the attainment of the objects of such processes at relatively low temperatures and pressures.

In one specific embodiment, the present invention comprises a process for destructively hydrogenating hydro-carbonaceous materials which consists in subjecting such materials at elevated temperatures and pressures and in the presence of hydrogen to contact with granular catalysts comprising essentially composites of zinc chloride and compounds of silica and alumina, including certain natural silicates and those artificially prepared by compositing silica and alumina in various ways.

An extensive series of experiments which we have conducted with the above mentioned type of catalysts indicates that they are of outstanding value in promoting destructive hydrogenation reactions. These catalysts are made by simple methods of mixing in which some form of finely divided or formed silicate or silica-alumina composite is mixed with zinc chloride, either in aqueous solution or dry, although as a rule, the use of aqueous solutions is preferable. After mixing the materials in various proportions, they are dried at approximately 350° C. for a period of about 20 hours. When formed materials are impregnated with zinc chloride solution, the particles are then ready for use in destructive hydrogenation and if powdered materials are employed, the material resulting from the calcination may be pulverized or granulated to produce particles of the desired size which can be used as such or formed by extrusion or pilling methods.

It is not certain whether the composition of these catalysts can be designated broadly by the formula $xZnCl_2.ySiO_2.zAl_2O_3$ or whether zinc oxychlorides are present. When using different proportions of zinc chloride and silicates or silica-alumina composites and different amounts of water, catalysts of varying composition are producible which have varying activities in reactions of destructive hydrogenation in which they may be employed. It has been found particularly beneficial in using the present types of catalysts in destructively hydrogenating hydrocarbons to have minor amounts of hydrogen chloride present, the effect of this addition being shown in later data in the section devoted to examples.

The materials which are preferably employed for compositing with zinc chloride to form the catalysts which characterize the present invention include several varieties which may be classified under the broad heading of silicates, either natural or artificial. Among the natural minerals which may be employed may be mentioned those of the kaolin type, and particularly kaolinite, holloysite, apophyllite, pyrophyllite, and montmorillonite or bentonite, which last is essentially a crude montmorillonite. On the side of synthetic materials which may be considered as artificial silicates may be mentioned composites made by various methods such as, for example, separately precipitating hydrated silica from sodium or other alkali metal silicate solutions by the addition of acids, separately precipitating hydrated alumina from solutions of aluminum salts by the addition of alkaline precipitants, mixing the hydrated silica and hydrated alumina in varying proportions and calcining, washing of the single or combined precipitates being done at some point to remove adhering and occluded materials from the solutions. As an alternative method, complexes of hydrated silica and hydrated alumina may be simultaneously precipitated by adding aluminum salts such as aluminum chloride to solutions of sodium silicate followed by separation of the composite precipitated, filtering, washing, calcining, and sizing. As a rule, the best silica-alumina composites for use in the present process are prepared by wet rather than by fusion methods and they function the best if they are substantially free from occluded salts, particularly those of the alkali metals, so that there is a minimum tendency for the composites to glaze or sinter when used or reactivated at relatively high temperatures.

The present types of catalysts may be used at temperatures within the approximate range of 100–500° C. though as a rule, the temperatures most commonly used fall within the limits of 350–450° C. Relatively high pressures of hydrogen are preferably of the order of 500–2000 lbs./sq. in. The process may be conducted on the batch or continuous basis although the latter method of operation is preferred commercially. In the batch process, the catalyst is mixed with the oil to be destructively hydrogenated in a pressure vessel preferably lined with material such as glass which has substantially no catalytic effect in the reaction as contrasted with metals, a small amount of hydrogen chloride is introduced, and hydrogen is admitted to develop the required pressure found by trial to be optimum for the desired conversions. The pressure vessel is then exteriorly heated during mechanical stirring of the contents or rotation of the vessel to insure thorough mixing and contact with the reactants and the catalyst. In continuous processes granular catalyst is utilized in stationary beds in vertical or horizontal cylindrical chambers and the mixture of hydrocarbons to be hydrogenated, hydrogen chloride, and hydrogen are forced through the granular material after which the products are separated by fractionation and the unconverted and reusable constituents recycled.

The present process is applicable to the destructive hydrogenation of individual compounds such as naphthalene and anthracene to form mono-nuclear aromatics and to the destructive hydrogenation of relatively heavy residua and distillate fractions of the petroleum to produce motor fuel fractions. The catalyst is also effective in such splitting reactions as the formation of iso-butane and benzene from sec-butyl benzene, and pentane and benzene from amyl benzene. This is in contrast with results obtained with more standard types of hydrogenating catalysts, such as nickel, which, for example, produces very little cleavage of the side chain of amyl benzenes and produces rather a mixture of alkyl cyclo-hexanes.

The following example is given to indicate the type of results obtainable by using the present types of catalysts in destructive hydrogenation reactions, although it is not intended to limit the scope of the invention in precise correspondence with the data thus introduced.

A catalyst was prepared by impregnating ⅛" by ⅛" cylindrical pellets consisting of a silica-alumina-zirconia composite with an aqueous solution of zinc chloride followed by drying first at 100° C. and then at 300° C. The zinc chloride constituted 33.3% by weight of the silica-alumina-zirconia composite which was prepared by suspending a precipitated hydrated silica in a solution of aluminum chloride and zirconium oxychloride and precipitating mixed hydrated alumina and zirconia by the addition of ammonia. The total suspended material was then washed and filtered followed by calcining, grinding to a powder and pilling to make the ⅛" by ⅛" cylindrical particles. The composite consisted of approximately 100 moles of silica, 2 moles of alumina, and 4 moles of zirconia.

Using the above described catalyst, a Pennsylvania gas oil was destructively hydrogenated at a temperature of 400° C. and an initial hydrogen pressure of 1500 lbs./sq. in. using an amount of catalyst equal to 10% by weight of the gas oil. There was produced by this operation in two runs an average of 56% by volume of 300 end-point gasoline and 67.5% by volume of 400 end-point gasoline which was completely saturated. The 300 end-point material had an octane number of 76.5 by the motor method. Under similar conditions but with the addition of 2% of hydrogen chloride by weight of the gas oil, there was obtained 61% by volume of 300 end-point gasoline and 73% by volume of 400 end-point gasoline. Furthermore, the yield of condensable gas (consisting essentially of propane, isobutane and isopentane) was increased from 7 to 23% by weight of the gas oil charged.

We claim as our invention:

1. A process for converting heavy hydrocarbonaceous material into lower boiling products which comprises destructively hydrogenating said material in the presence of a composite of zinc chloride with a cracking catalyst comprising silica and alumina.

2. The process as defined in claim 1 further characterized in that said cracking catalyst comprises a naturally occuring silicate.

3. The process as defined in claim 1 further characterized in that said cracking catalyst comprises a calcined mixture of silica and alumina hydrogels.

4. The process as defined in claim 1 further characterized in that said cracking catalyst comprises a synthetically prepared silica-alumina-zirconia composite.

5. The process as defined in claim 1 further characterized in that the destructive hydrogenation is effected at a temperature in the approximate range of 100–500° C. and under a pressure of the order of 500–2000 pounds per square inch.

6. The process as defined in claim 1 further characterized in that the destructive hydrogenation is effected in the presence of hydrogen chloride.

7. A process for the production of mono-nuclear aromatics from poly-nuclear aromatics which comprises destructively hydrogenating the poly-nuclear aromtaic in the presence of a composite of zinc chloride with a cracking catalyst comprising silica and alumina.

8. A process for producing paraffins from alkylated aromatics which comprises subjecting the latter to destructive hydrogenation in the presence of a composite of zinc chloride with a cracking catalyst comprising silica and alumina.

9. A process for producing gasoline from heavier petroleum fractions which comprises destructively hydrogenating said fractions in the presence of a composite of zinc chloride with a cracking catalyst comprising silica and alumina.

VLADIMIR N. IPATIEFF.
LOUIS SCHMERLING.